US011055580B2

(12) United States Patent
Amon et al.

(10) Patent No.: US 11,055,580 B2
(45) Date of Patent: Jul. 6, 2021

(54) METHOD AND APPARATUS FOR ANALYZING AN IMAGE

(71) Applicant: SIEMENS AKTIENGESELLSCHAFT, Munich (DE)

(72) Inventors: Peter Amon, Munich (DE); Andreas Hutter, Munich (DE); Sanjukta Ghosh, Schwaig bei Nürnberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/615,568

(22) PCT Filed: Jun. 4, 2018

(86) PCT No.: PCT/EP2018/064631
§ 371 (c)(1),
(2) Date: Nov. 21, 2019

(87) PCT Pub. No.: WO2018/224442
PCT Pub. Date: Dec. 13, 2018

(65) Prior Publication Data
US 2021/0089816 A1    Mar. 25, 2021

(30) Foreign Application Priority Data
Jun. 5, 2017  (IN) .............................. 201711019646

(51) Int. Cl.
*G06K 9/62* (2006.01)
*G06T 7/194* (2017.01)
(Continued)

(52) U.S. Cl.
CPC .............. *G06K 9/628* (2013.01); *G06T 7/143* (2017.01); *G06T 7/194* (2017.01);
(Continued)

(58) Field of Classification Search
CPC ........... G06K 9/00771; G06K 9/00791; G06K 9/628; G06T 7/143; G06T 7/194;
(Continued)

(56) References Cited

U.S. PATENT DOCUMENTS 7,505,621 B1      3/2009  Agrawal et al.
7,970,205 B2 *    6/2011  Iwasaki .................. G06T 7/215
                                                                  382/155
(Continued)

FOREIGN PATENT DOCUMENTS

CN      103914702 A    7/2014
CN      106688011 A    5/2017
(Continued)

OTHER PUBLICATIONS

Ghosh et al. "Pedestrian Counting using Deep Models Trained on Synthetically Generated Images." VISIGRAPP (5: VISAPP). Feb. 27-Mar. 1, 2017. (Year: 2017).*
(Continued)

*Primary Examiner* — Katrina R Fujita
(74) *Attorney, Agent, or Firm* — Lempia Summerfield Katz LLC (57) ABSTRACT

The disclosure relates to a method and an apparatus for analyzing an image using a deep neural net pre-trained for multiple classes. The image is processed by a forward pass through an adapted neural net to generate a processing result. The adapted neural net is adapted from the pre-trained neural net to focus on exactly one selected class. The processing result is then analyzed focused on features corresponding to the selected class using an image processing algorithm. A modified image is generated by removing a manifestation of these features from the image.

11 Claims, 4 Drawing Sheets

(51) Int. Cl.
*G06T 7/143* (2017.01)
*G06K 9/00* (2006.01)
(52) U.S. Cl.
CPC ..... *G06K 9/00771* (2013.01); *G06K 9/00791* (2013.01); *G06T 2207/20081* (2013.01); *G06T 2207/20084* (2013.01); *G06T 2207/30232* (2013.01); *G06T 2207/30242* (2013.01); *G06T 2207/30252* (2013.01)
(58) Field of Classification Search
CPC . G06T 2207/20081; G06T 2207/20084; G06T 2207/30232; G06T 2207/30242; G06T 2207/30252
See application file for complete search history.

(56) References Cited

U.S. PATENT DOCUMENTS

| | | | |
|---|---|---|---|
| 2011/0150328 A1 | 6/2011 | Han et al. | |
| 2014/0185925 A1 | 7/2014 | Datta et al. | |
| 2016/0110613 A1* | 4/2016 | Ghanem | G06T 7/215 382/103 |
| 2017/0287137 A1* | 10/2017 | Lin | G06N 3/08 |
| 2018/0107896 A1* | 4/2018 | Sagong | G06K 9/4604 |
| 2018/0253865 A1* | 9/2018 | Price | G06N 3/0454 |
| 2020/0012923 A1* | 1/2020 | Ghosh | G06K 9/00369 |

FOREIGN PATENT DOCUMENTS

| | | |
|---|---|---|
| EP | 2838054 A2 | 2/2015 |
| WO | 2016037300 A1 | 3/2016 |

OTHER PUBLICATIONS

Notification of Transmittal of the International Preliminary Report on Patentability for corresponding PCT/EP2018/064631 dated Sep. 3, 2019.
Segui, Santi, Oriol Pujol, and Jordi Vitria. "Learning to count with deep object features." Proceedings of the IEEE conference on Computer Vision and Pattern Recognition Workshops. 2015. pp. 90-96.
Zhang, Cong, et al. "Cross-scene crowd counting via deep convolutional neural networks." Proceedings of the IEEE conference on computer vision and pattern recognition. 2015. pp. 833-841.
Chinese Office Action for Chinese Application No. 201880037330.4 dated Dec. 25, 2020.

* cited by examiner

METHOD AND APPARATUS FOR ANALYZING AN IMAGE

The present patent document is a § 371 nationalization of PCT Application Serial No. PCT/EP2018/064631, filed Jun. 4, 2018, designating the United States, which is hereby incorporated by reference, and this patent document also claims the benefit of Indian Patent Application No. 201711019646, filed Jun. 5, 2017, which is also hereby incorporated by reference.

TECHNICAL FIELD

The disclosure relates to a method and an apparatus for analyzing an image using an artificial deep neural network, also denoted as a neural net.

BACKGROUND

Image analysis is a common problem in various applications. In applications like surveillance, driver assistance systems, autonomous driving, or any application where information about the environment is required, analyzing images to detect objects is an important task. Moreover, there may be a need to detect specific kinds of objects like pedestrians or vehicles. Especially in scenarios where there are multiple foreground objects close together and/or partly occluded, a correct image analysis, that is, the correct detection of all objects becomes challenging.

There exist various approaches to tackle image-based object detection in these difficult scenarios. One method uses visual contexts based on scale and occlusion cues from detections at proximity to detect pedestrians for surveillance applications, especially for crowded scenarios. Another approach uses a probabilistic pedestrian detection framework. In this framework, a deformable part-based model is used to obtain scores for part-detections and the visibilities of parts are modelled as hidden variables. Another method uses a quadratic unconstrained binary optimization framework for reasoning about multiple object detections with spatial overlaps. This method maximizes an objective function composed of unary detection confidence scores and pairwise overlap constraints to determine which overlapping detections may be suppressed, and which may be kept. Another approach combines a determinantal point process combined with an individualness to optimally select final detections. Therein, each detection is modelled using its quality and similarity to other detections based on the individualness. Detections with high detection scores and low correlations are then selected by measuring their probability using a determinant of a matrix, which is composed of quality terms on the diagonal entries and similarities as the off-diagonal entries. Yet another approach uses a hierarchical co-occurrence model to enhance the semantic representation of a pedestrian. Therein, a latent support vector model (SVM) structure is employed to model the spatial co-occurrence relations among the parent-child pairs of notes as hidden variables for handling the partial occlusions.

The paper "Cross-scene Crowd Counting via Deep Convolutional Neural Networks" by Cong Zhang, et al., 2015 IEEE Conference on Computer Vision and Pattern Recognition, IEEE, 7 Jun. 2015, pages 833-841, XP032793494, doi: 10.1109/CVPR.2015.7298684 proposes to solve the cross-scene crowd counting problem with deep convolutional neural network. Therein, a switchable training scheme with two related learning objectives, estimating density map and global count, is proposed. Further, a data-driven method is proposed to select samples from the training data to fine-tune the pre-trained CNN model adapting to the unseen scene.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is an objective of the present disclosure to provide an alternative, easy to implement approach for accurately analyzing an image. This objective is achieved by a method and an apparatus disclosed herein.

A method is concerned with analyzing an image, wherein the image may have features corresponding to at least one class. For this purpose, an artificial deep neural net that is pre-trained for multiple classes. The pre-trained neural net is adapted for one class, that is, to focus on exactly one selected class of the multiple classes it has learned. The term class may refer to an object category, an object count, an object condition, and the like. The number of classes the neural net has learned may be equal to a number of nodes of an output layer of the neural net. After adapting the neural net, the image is then processed by a forward pass through the adapted neural net to generate a processing result. A next act includes analyzing the processing result focused on features corresponding to the selected class using an image processing algorithm, in particular a low-level image processing algorithm, that may not be part of the machine learning domain. This includes detecting a manifestation or instance of the features, e.g., at least one object corresponding to the selected class in the processing result. Because of the adaption, the adapted neural net is focused on the selected class and therefore the processing result is focused on features, e.g., the at least one object corresponding to the selected class. In addition, the image processing algorithm or the image analysis using the image processing algorithm, respectively, may also be focused the features corresponding to the selected class. This may lead to an improved image analysis result, because the image processing algorithm and/or the image analysis may be, in particular automatically, selected and/or adjusted in dependence of the selected class to, for example, detect or prioritize features corresponding to the selected class. In a next act of the method, a modified image is generated by removing a manifestation or instance of the features, in particular the previously detected manifestation or instance thereof, corresponding to the selected class from the image. The modified image may be generated using a separate image processing unit which may but does not necessarily have to use a neural net.

In an advantageous development, the modified image is iteratively used as input for the adapted neural net to analyze the modified image for possible remaining manifestations of the features corresponding to the selected class. Because the neural net is adapted and thus focused on the selected class, it may only detect one manifestation per iteration, even though the image may contain multiple manifestations, instances or occurrences of the selected class or of features corresponding thereto. A single iteration may then only detect and remove one manifestation, instance, or occurrence. By using an iterative process, it thus becomes possible to maximally focus the neural net and still detect all feature manifestations present in the image sequentially. Overall this approach may yield a more detailed, precise result of the image analysis. Additionally, or alternatively, the pre-trained neural net is pre-trained for counting objects in images and the pre-trained neural net is adapted for counting exactly one object. This is explained in further detail below.

It is also possible to adapt the pre-trained neural net or further adapt the adapted neural net for a different class and then use the modified image as input for this differently adapted neural net. This allows for a more detailed analysis of the image by, for example, iteratively and/or sequentially detecting features corresponding to different classes.

The processing result is an output of the adapted neural net after the forward pass. A certain state or activation of the adapted neural net resulting from or occurring during the processing of the image may also be considered for the processing result. It is also possible to do additional processing acts after or besides the forward pass to generate the processing result.

A low-level image processing algorithm as well as low-level image processing refers to algorithms and methods that are not part of the machine learning domain and/or that are not concerned with the interpretation or classification of a scene or an image as a whole. Rather, these low-level techniques may include pixel-based operations, finding corresponding points, edge detection, and the like.

Throughout the following description an example is referred to on occasion for illustrative purposes. In the example, the neural net is pre-trained for counting objects, in particular, for counting pedestrians in images, and the method is used for detecting objects. This example may then be generalized and details and terms of the example may be replaced by the broader terms as used in the claims. In this sense, the multiple classes for which the neural net is trained are different counts of objects, such that the adapted neural net is configured to count a specific number of objects as given by the selected class. It is, however, to be understood that the present disclosure is by no means limited to this example because the neural net may in principle be pre-trained for arbitrary classes. Also, the present disclosure may be used to analyze arbitrary images. Therefore, the term image is to be interpreted broadly and may refer to different kinds of images or image data. An input, that is, an image to be analyzed might for example be a scene or an image captured by a surveillance camera or a camera that is part of an assistance system of a car.

Instead of directly using an image captured by a camera, it is also possible to use image data that has been pre-processed in some way. The image may be a crop of a larger image that has been subdivided. It is, for example, also possible to use as the image an output—for example the contents of a bounding box—resulting from a regional proposal algorithm or object detection algorithm, or a result or an output from a change detection algorithm. Such a pre-processing algorithm, the outputs of which are used as the image to be analyzed, may be a low-complexity algorithm operating in the compressed domain. In particular, the image may be a whole image or a crop of an image output by another algorithm that is not capable of separating closely spaced objects or that identifies larger areas compared to the sizes of the actual objects.

When the proposed method is used for detecting objects, it may be especially effective when the input, that is, the image to be analyzed, is focused on a small region with one or more closely spaced objects or object occluding one another. A larger image may depict multiple groups of pedestrians and may be subdivided into crops that may have zero, one or more pedestrians in them. In case the starting image is pre-processed by a detection algorithm the method described herein may be used as a post processing act to detect objects inside a bounding box generated by the detection algorithm to detect objects contained in that bounding box in greater detail and with better accuracy.

It may be especially advantageous to use a crop of a larger image as the image to be analyzed using the present disclosure. The reason for this is that the performance of the object detection improves when there is less background information in the input image or crop because the neural net then does not have to remove the background but may focus on specific foreground objects to be detected. In a tight crop these foreground objects to be detected make up a larger portion of the input image.

A deep neural net is a neural net including multiple layers. The pre-trained neural net may be trained from scratch starting with randomly initiated weights and/or other parameters. It may also be pre-trained for counting objects by transfer learning starting from a baseline neural net trained for general image classification. The adaptation of the pre-trained neural net to exactly one class may then be done with significantly less time and effort then training or creating a new neural net from scratch. To adapt the pre-trained neural net, training data may be provided to the pre-trained neural net. This training data may with very little effort be labelled or annotated with the selected class, which might for example require only a single word or number. Adapting the pre-trained neural net may also be referred to as tuning the pre-trained neural net. This adapting or tuning may be achieved by doing a gradient descent process on the error surface, that is, the error function for the specific data point, that is, the specific image used as training data, using a backpropagation method. The weights and/or other parameters of the pre-trained neural net are updated during the adaptation or tuning process by running for example multiple iterations of gradient descent or backpropagation for the specific training data image. Adapting the pre-trained neural net to the selected class allows or forces it to focus on features or causes of the respective input corresponding to the selected class. Features belonging or corresponding to another class or even additional manifestations corresponding to the same class might be discarded. This may result in sparse representations in the intermediate layers of the adapted neural net. If the method is used for detecting objects, this may advantageously be exploited to separate closely spaced or occluded objects. If the image has at least one manifestation of features corresponding to the selected class, the adaptation provides that the adapted neural net will provide a classification of that image equal to the selected class. If there are multiple manifestations of these features present in the image, then on which one of these the neural net focuses may depend on not readily apparent features or characteristics of the specific image and/or the specific adapted neural net or its training history.

In the present description a trained, pre-trained, or adapted neural net may also be referred to as a model.

Processing the image by a forward pass means that the image is provided as an input to a first or input layer of the neural net which then works on this input and provides a corresponding result or output at a final or output layer. The forward pass through the neural net therefore includes a data flow from the input layer to the output layer, that is, from the lowest to the highest layer in a hierarchical layer structure of the neural net. The neural net pre-trained for the selected class may therefore accept an image as input and provide as the output the probability for the input image to belong to different classes according to the structure and training of the neural net.

Advantageously, the processing result may be taken from at least one filter of at least one intermediate layer and/or from an output layer of the adapted neural net. In this case a respective state or activations of the filter or layer may serve as the above-mentioned processing result. It is, in other words, possible to use a state, activation, or output of one or more layers and/or filters of one or more different layers of the adapted neural net as the processing result to be analyzed by the image processing algorithm. Alternatively, or in addition, it is possible to use a final output of the forward pass at the highest layer of the adapted neural net as the processing result. Because the different filters and layers of the adapted neural net correspond to different features and properties of the image, this approach allows for an advantageous customization of the present method in dependence of the requirements of the respective application and/or in dependence of the image. The filters and/or layers to be used as the processing result may therefore be selected corresponding to a predetermined analysis task and/or in dependence of a predetermined characteristic or type of the image or images to be analyzed. Different types of images may be more effectively analyzed by using different filters and/or layers as the basis of the processing result. It may be advantageous to use a filter of a higher layer and one from a lower layer in order for the respective image analysis result to contain data about specific, low-level features of the image as well as data about more general or abstract, high-level features or concepts of the image.

It may also be advantageous to process the image not only by the forward pass but also a subsequent backward pass through the adapted neural net to generate the processing result. The backward pass thus constitutes an additional processing act after the forward pass but before using the image processing algorithm to analyze the processing result. In this case, the processing result is or is derived from an output of the backward pass. A backward pass through a neural net refers to processing data using the neural net in the opposite direction as compared to the direction used in the forward pass. The backward pass therefore includes a data flow from a higher layer to a lower layer of the respective neural net. After the backward pass the processing result, that is, the output of the backward pass may represent or resemble an image wherein only features or causes of the original input image belonging or corresponding to the selected class are visible or highlighted. This is the case, because other features of the input image are discarded or disregarded during the forward pass and are not reconstructed during the backward pass. One possibility for implementing the backward pass is to use the transpose of the weights learned by the respective neural net which have been used for the forward pass. Using the additional act of the backward pass may be advantageous because the result or output of the backward pass may be less abstract than the processing result gleaned directly from the forward pass and may therefore be easier to analyze using a conventional image processing algorithm. Using the result or output of the backward pass may therefore lead to an improved result of the image analysis.

Analogous to the above-mentioned processing result of the forward pass, the processing result after the backward pass may also be taken from at least one filter of at least one intermediary layer of the adapted neural net.

In an advantageous development, the backward pass is started from an intermediate layer of the adapted neural net. The output of a filter of the intermediate layer after the forward pass may serve as a starting point for the backward pass. It is also possible to use a combination of outputs of different filters from different layers for processing by the backward pass. This results in an output of the backward pass in which the features of the processed image causing the corresponding activations of the filter or filters are visible. Because the different layers or their filters or activations correspond to different features or feature combinations of the image, starting from an intermediate layer allows for a targeted selection of which features or feature combinations become visible in the output of the backward pass and are therefore used for or influence the image analysis result. This advantageously allows for a finely tuned customization of the image analysis. It is, however, also possible to start the backward pass from the highest layer of the adapted neural net to focus only on the most specific features corresponding to the selected class.

Advantageously, a deep convolutional neural net, and/or a deep feedforward neural net, and/or a deep recurrent neural net is used as deep neural net. The deep neural net may therefore have features or characteristics of one of these types of neural nets or features or characteristics of a combination of some or all of these types of neural nets. This allows for adapting the properties and behavior of the neural net to different applications.

Using a convolutional neural net (CNN) is especially advantageous for image processing and analysis because a high accuracy may be achieved. This is partly because of the implicit assumption of locality. This means that by using a CNN, it is possible to take advantage of the fact that in typical images and with typical objects depicted therein pixels located in the same region of the image are more likely to be related, that is, to belong to the same object, than pixels that are farther away or apart. A disadvantage of conventional approaches using a CNN for image analysis is that large amounts of extensively annotated training data are required to train the CNN. This problem is avoided by using a pre-trained CNN that has already learned different classes and then adapting this CNN for the specific task, use-case, or application. The pre-trained CNN may be trained using synthetic image data. The adaptation or tuning of this pre-trained neural net requires significantly less training data which may also be annotated with significantly less effort.

The present disclosure thus enables the analysis of new images or image data without the need for large amounts of training data and/or extensive labelling or annotations. Especially in the case of using a CNN, a backward pass through the CNN may also be referred to as a deconvolution pass or simply a deconvolution. A deconvolution pass may therefore involve starting from one of the learned filters at a layer of the CNN and doing the reverse data processing acts of successive unpooling, rectification, and filtering to reconstruct the activity in the layer beneath, that gave rise to the chosen activation of the learned filter where the deconvolution pass started. Accordingly, the output of the deconvolution pass may be referred to as deconvolved output.

Feedforward neural nets have the advantage of being very robust, meaning that their performance degrades gracefully in the presence of increasing amounts of noise. Using a recurrent neural net may be especially advantageous for analyzing data with a temporal structure, such as for example a time series of multiple images or a video feed.

Advantageously, the pre-trained neural net is adapted offline using training data, in particular using synthetic images. The pre-trained neural net is, in other words, adapted for the selected class—for example for counting exactly one object—in a training or tuning phase prior to analyzing or processing the target image or target dataset, that is, prior to productively using the adapted neural net in a specific application. It is particularly advantageous to use synthetic images as training data because those may be easily mass-produced, managed, and specifically created or tailored to fit the respective use case and to avoid any unintentional biases. It is, however, also possible to use natural images, that is, images of real scenes. Using natural images may have the advantage of better preparing the neural net for its intended application. This may especially be the case if something is known about the images to be analyzed in that particular application or if images from an intended target location where the target images will come from are available. It is also possible to use a combination of synthetic and natural images to train, pre-train, and/or adapt the neural network. Because the required labelling or annotation may be very simple and may include only applying the selected class—for example a number or count of one for counting one object—to each image of the training data, this labelling may advantageously be done automatically. Thus, the overall required time and effort to generate the adapted neural net is significantly lower than the required time and effort for generating a new neural net capable of a similar performance analyzing images, for example in detecting objects.

In an advantageous development, the pre-trained neural net is adapted online using the image to be analyzed. This is done before this same image is processed by the corresponding forward pass through the adapted neural net. In other words, the specific image to be analyzed is used as training data to adapt the pre-trained neural net. This means that the actual target data is used for the tuning process which may advantageously result in an improved image analysis performance. To achieve this the target image, that is the image provided as input to be analyzed, may be labelled or annotated with the selected class, be provided as training data to the pre-trained neural net, and—after the adaptation is completed—be processed using the adapted neural net and subsequently the image processing algorithm. This approach may be used for every image to be analyzed so that a tuning act is done for every input image to be analyzed. This advantageously allows for flexible and accurate use of the presently described method even in practical applications with different and/or changing input data, that is, with variable images to be analyzed. Overall, this approach may yield particularly accurate results because the adaptation does not need to rely on training data that differs from the target data to be analyzed in the respective productive application.

In this manner, off-line training refers to using training data that differs from the target image or target dataset to be analyzed, while online training refers to using the same target data, that is later to be analyzed, for training and/or tuning purposes.

In an advantageous development, the neural net is adapted using a group of images. After the adaptation is completed, the group of images is sequentially processed without further adaptation acts between analyzing the images of the group. This means, that the pre-trained neural net is adapted for the group of images instead of doing a respective adaptation act before analyzing each individual image to detect the respective objects in the images. The adaptation act is, in other words, done for the group or a set of images or inputs and not for every input or image individually. In this fashion, instead of tuning the pre-trained neural net for the selected class only for a single image, the group of images may be used together for a combined adaptation act to speed up or expedite the overall processing speed. Using a group of images for adapting the neural net may be done offline as well as online. While adapting the pre-trained neural net to every image to be analyzed may yield improved or more accurate image analysis results, using the group or a batch of multiple images to adapt the pre-trained neural net and then processing and analyzing all images of the respective group may advantageously result in a lower overall processing time needed to analyze all images of the group. This may especially advantageous, if the application is time-sensitive and/or if the images of the group are similar or related to each other. In the latter case, the omission of a tuning act for each individual image before processing the image may not result in significantly lowered quality or accuracy of the image analysis.

Independent of the implemented adaptation variant, this approach may yield accurate image analysis results because the adaptation does not need to rely on training data that differs from the target data, that is, the actual images to be analyzed.

It is also possible to use a combination of the above-mentioned approaches or methods for adapting the pre-trained neural net. The pre-trained neural net may be adapted offline, then deployed to its productive environment or application and adapted again, that is fine-tuned, using the actual target images to be analyzed. Using different combinations of tuning methods advantageously offers a high amount of flexibility and allows for customization of the method to fit different needs and use cases in terms of required preparation or training time, required processing time for processing a respective target dataset, and image analysis—especially object detection—accuracy.

Offline training or tuning refers to using training data that differs from a target image or target dataset to be analyzed, while online training or tuning refers to using the same image or target data later to be analyzed for training and/or tuning purposes.

In an advantageous development, the pre-trained neural net is pre-trained for counting objects in images. The neural net is, in other words, pre-trained to classify images according to a number of objects depicted therein. Each class of the classifier or output layer of the pre-trained neural net may therefore represent or correspond to a different count of objects. If there are, for example, 16 different classes or categories, the neural net might be capable of classifying images with anywhere from 0 to 15, or 1 to 16, or any 16 different numbers of objects, according to the respective number of objects depicted in each image. It is to be noted that counting objects does not necessarily include detecting or specifying individual locations or outlines of each object. Training the neural net for counting objects therefore requires significantly less detailed annotations in the training data than, for example, training the neural net to detect individual objects. The neural net may be pre-trained for counting at least one specific type of object, such as for example pedestrians or cars.

Therein, the pre-trained neural net is adapted for counting exactly one object. If there is at least one object present in the image, processing the image by the forward pass thus results in counting exactly one object. This is the case even if the image contains multiple objects of the type for which the neural net is pre-trained. Counting one object means focusing on one object and disregarding features belonging or corresponding to other objects that might be depicted in the same image. If there is at least one object present in the image, the adapted neural net will therefore provide a classification of the image of 1, meaning that it has counted one of the objects depicted in the image.

At least one object corresponding to the selected class is detected in the processing result by using the image processing algorithm to analyze the processing result. This means that object detection is done using simple, low-level image processing techniques.

Object detection is a common problem in various applications. In applications like surveillance or driver assistance systems or autonomous driving or any application where information about the environment is required, detecting objects is an important task. Moreover, there may be a need to detect specific kinds of objects like pedestrians or vehicles. Especially in scenarios where there are at least two objects close together or occluding other foreground objects, the detection may become challenging though. Combining object detection techniques using the image processing algorithm with processing the image by a neural net pre-trained for counting objects—and especially a neural net that is adapted for counting one object—may yield especially accurate image analysis and object detection results. This is the case even without providing training data, wherein each of multiple objects is outlined and labelled in a detailed fashion. Not only the highest layer of the neural net but also the intermediate layers of the neural net may learn meaningful features of foreground objects to be detected. It may therefore be beneficial to use filters or activations from different layers as the processing result to detect not only objects but to focus on specific features.

While the neural net advantageously does not need to be trained for detecting objects, processing the image using the neural net may result in significantly easier, faster, more accurate, and more reliable object detection using the image processing algorithm. Because the neural net may put a focus or relative emphasis on features corresponding to the selected class—for example, one object or a specific type of object—the image processing algorithm does not have to deal with other features of the original input image. This may reduce the chance for false positive detection. The neural net may be configured to count exactly one object which may then be detected using the image processing algorithm.

By removing each individually counted or detected object from the image, it is possible to iteratively detect multiple objects in the same image. Because the detected object is removed, its features no longer influence the neural net in a following iteration act. Thus, it becomes possible to accurately detect even closely spaced or partly occluded objects. The present disclosure therefore offers improved counts or detections in such scenarios. Because the used neural net does not need to be trained for object detection explicitly, there is no need for an elaborate indication or annotation of the exact locations of the objects to be detected in the training data, which may require a large investment of time and effort during supervised training. By contrast, the annotations required for training the neural net for counting are very simple because only a single number which is the count of the objects is required. The tuning of the pre-trained neural net may be achieved with comparatively very few images.

In an advantageous development, the detected object is removed from the image by replacing pixel values of pixels corresponding to the detected object with a predetermined value. The pixels or parts of the image belonging to or corresponding to the detected object may be replaced by uniformly colored pixels or areas. After the replacement, the replacement area or region made up of the pixels having the predetermined pixel value or values may be featureless. The predetermined value used for the replacement pixels may be a predetermined constant value. It is also possible to use a pixel value derived from at least one pixel neighboring the detected object or the region corresponding to the detected object. Pixel values in this sense may in particular refer to color, intensity, and/or brightness. The pixels corresponding to the detected object may be the specific pixels making up the detected object or all pixels within a bounding box or a similar, (for example, segmented), region determined to correspond to the detected object. The pixels corresponding to the detected object may be determined by the low-level image processing algorithm. By removing the detected object from the image in this manner any features that caused the adapted neural net to count this object are obliterated. This advantageously provides that the same features or object are not counted and/or detected again in subsequent iterations of counting and/or detection acts.

In an advantageous development, the analysis of the processing result using the image processing algorithm—for example the detection of the counted object—includes pseudo-coloring and/or highlighting regions based on intensity and/or thresholding and/or contour detection and/or generating a bounding box, in particular a bounding box enclosing or surrounding a detected contour or object. These tasks may be automatically carried out using low-level image processing techniques and thus do not require the use of a neural net. Pseudo-coloring may be used to generate or create color variations based on sine wave generation for different color channels. Thresholding may be used to discard parts of the deconvolved output having one or more values, such as intensity, below a predetermined threshold value. Generating a bounding box may advantageously provide a reference area or region assigned to or associated with the counted object. The bounding box may therefore be used to indicate the detected object to a user and/or another program or system. Because the bounding box may be a geometric primitive form, for example a rectangle, this may be done with much less processing effort than using a complex detailed outline or shape of the detected object. The bounding box may be added to the processing result and/or to the input image.

In a further advantageous development, the object is detected using at least one predetermined optimization criterion. This may, in particular, be or include using at least one predetermined constraint for a boundary smoothness and/or for an area of the image and/or of the processing result. A constraint in this sense may include one or more predetermined threshold values, such that for example a boundary or contour is interpreted to indicate an object if the corresponding boundary smoothness and/or area surrounded by the boundary or contour is greater or smaller than the predetermined threshold value and/or lies between two predetermined threshold values. Different threshold values or constraints may be provided and used for detecting different objects and/or different kinds of objects. Using at least one such predetermined optimization criterion may enable fast and reliable object detection, in particular, because features or causes corresponding to the object to be detected are highlighted or relatively emphasized by processing the image using the adapted neural net prior to using the image processing algorithm.

In an advantageous development, the object is detected by treating pixels of the image or processing result as a Markov random field and using a predetermined constraint on a gradient of intensities. Here, the above-mentioned optimization criterion may be or include at least one predetermined constraint for the gradient of intensities. Among other advantages and benefits this approach may be especially advantageous because a Markov random field may be used to detect and segment objects in an image simultaneously and may therefore yield fast and accurate object detection and segmentation, as might be required in time-sensitive and/or safety related applications. A Markov random field model may also advantageously be used to detect moving objects with improved accuracy.

In case multiple objects are detected due to parameters of the image processing algorithm or thresholding one of the detected objects may be selected in dependence of a predetermined criterion. This may be useful for focusing the method on detecting only a single object at a time. If a bounding box is generated for each detected object, the criterion for selecting one of the objects may be the area of the bounding boxes. For example, the object corresponding to or marked by the bounding box having the largest area may be selected. This may be advantageous based on the assumption that the majority of specific, for example high-intensity, regions of the deconvolved output belong to a single object.

In an advantageous development, the pre-trained neural net is used to process or analyze the image to obtain a reference class for the image before adapting the pre-trained neural net. The image may, in other words, be processed by a forward pass through the pre-trained neural net prior to its adaptation for the selected class. If for example the neural net is pre-trained for counting objects, the reference class may be a reference count of objects. This may be useful to get an estimate of the number of objects present in the image. The reference class may provide a comparative value to gauge the performance or accuracy of the pre-trained and/or the adapted neural net.

The reference count may advantageously also provide a lower bound for the number of iterations necessary to detect all objects depicted in the image to be analyzed. This is the case because with every iteration one object is counted, detected and removed so that every iteration lowers the number of remaining undetected objects by one. The lower bound for the number of required iterations may provide an estimate for the required total processing time. It may also be used to, especially automatically, select a tuning method for the adaptation act of the described method. It is, in other words, possible to automatically select a variation of the method for detecting objects in the image in dependence of the reference count.

If for example the reference count exceeds a predetermined threshold value, an online adaptation using the image may be omitted to reduce overall processing time. If, on the other hand, the reference count is below a predetermined threshold value, the online adaptation act may be carried out and/or the modified image resulting from each iteration may also be used for a separate online adaptation prior to processing the respective modified image. The described use of the modified image as training data for the online adaptation for the next iteration act may of course be used in other variants of the method as well. It may also be advantageous to use the reference class, in particular a reference count of zero or one as an exit condition. This means that if the processing of the image using the pre-trained neural net results in a reference count of zero or one, further processing of the image may be stopped or cancelled to save the required processing time and effort. This approach may advantageously be used to very quickly process or classify multiple images. Thus, the capability of the pre-trained neural net to count objects may be used to initiate and possibly terminate the algorithm, that is, the processing or analysis of the input image, because the pre-trained neural net or the reference count it provides may be used as a check.

Another aspect besides the method described herein is an apparatus for analyzing an image. The image may have features of or corresponding to at least one class. The apparatus includes an artificial deep neural net pre-trained for multiple classes, and a separate image processing unit. The apparatus is configured to process the image by a forward pass through an adapted neural net to generate a processing result that is an output of the adapted neural net. The adapted neural net is adapted from the pre-trained neural net for, that is, to focus on exactly one selected class of the multiple classes. The apparatus is further configured to provide the processing result to the image processing unit. The image processing unit is configured to analyze the processing result focused on the features corresponding to the selected class, e.g., to detect at least one object corresponding to the selected class using an image processing algorithm. The image processing unit is further configured to generate the modified image by removing a manifestation of the features corresponding to the selected class from the image. In one development, the apparatus is configured to iteratively use the modified image as input for the adapted neural net to analyze the modified image for possible remaining manifestations of the features corresponding to the selected class. In additional or alternative development, the pre-trained neural net is pre-trained for counting objects in images and the pre-trained neural net is adapted for counting exactly one object.

The apparatus may include a processing unit (CPU), a memory device, and an I/O-system. In particular, the apparatus may be configured to carry out or conduct at least one embodiment of a method. For this purpose, the apparatus may include a memory device or data store containing program code representing or encoding the acts of this method. The memory device or data store containing this program code may on its own also be regarded as one aspect of the present disclosure. The respective embodiments of the method as well as the respective advantages may be applied to the apparatus, the memory device or data store, and/or the program code contained therein as applicable and vice versa.

The apparatus may further be configured to iteratively use a modified image generated by the image processing unit as input for the adapted neural net to analyze the modified image for possible remaining manifestations of the features corresponding to the selected class.

The apparatus may also be configured to adapt the pre-trained neural net to the selected class, that is, to focus on features corresponding to the selected class. To achieve this, the apparatus may include an adapting stage. This adapting stage may be configured to run multiple iterations of gradient descent to adapt the pre-trained neural net using training data. The number of iterations may be predetermined. The number of iterations may also be determined by a predetermined threshold value for a difference between a respective actual and an intended output of the neural net. The intended output may be a classification of the respective training data or image as belonging to the selected class with a probability or confidence value equal to or greater than the predetermined threshold value.

It is also possible to provide the adapted neural net as part of the apparatus.

BRIEF DESCRIPTION OF THE DRAWINGS

Further advantages, features, and details of the present disclosure derive from the following description of embodiments as well as from the drawings pertaining to the present disclosure. The features and feature combinations previously mentioned in the description as well as the features and feature combinations mentioned in the following description of the figures and/or shown in the figures alone may be employed not only in the respectively indicated combination but also in other combinations or taken alone without leaving the scope of the disclosure.

In the drawings.

DETAILED DESCRIPTION

Figure 1:
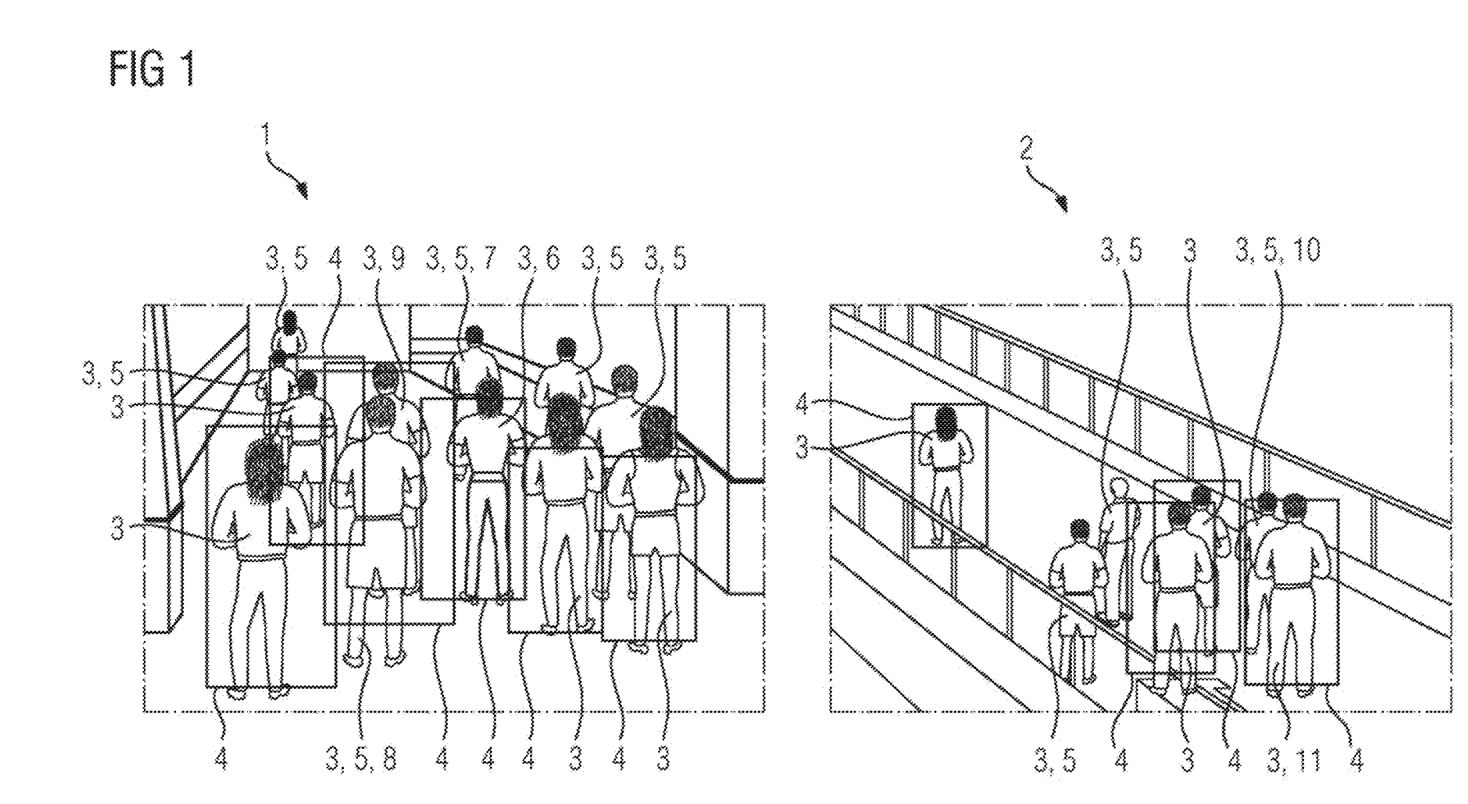
FIG. 1 schematically depicts an example of two scenes, each with multiple partly occluded pedestrians and multiple bounding boxes generated by a conventional object detection algorithm.

FIG. 1 schematically depicts a first scene 1 and a second scene 2, each showing multiple pedestrians 3. The scenes 1, 2 may be images taken by a surveillance camera. The pedestrians 3 may be considered to be objects, in particular foreground objects, that are to be automatically detected by a method and an apparatus for analyzing an image, in particular for detecting one or more objects in an image.

Also depicted in FIG. 1 are multiple object bounding boxes 4 generated by a conventional object detection algorithm. As may easily be seen, the multiple pedestrians 3 include some who are partly occluded. These are referred to as occluded pedestrians 5. The pedestrian 6, for example, partly includes the pedestrian 7 in scene 1. In a similar manner, the pedestrian 9 is partly occluded by the pedestrian 8. An example in scene 2 is the partly occlusion of the pedestrian 10 by the pedestrian 11.

The scenes 1, 2 therefore represent difficult to analyze images with closely spaced objects of which some are also partly occluded. As a result, conventional object detection algorithms cannot reliably and accurately detect all the objects, that is all the pedestrians 3 in the scenes 1, 2, or similar images. This becomes obvious when considering the object bounding boxes 4. Some of these surround multiple pedestrians 3 as for example the pedestrians 8 and 9, indicating that the used detection algorithm is not capable of discriminating between these objects. Also, some of the pedestrians 3 such as for example the pedestrian 7 are not detected and are therefore not surrounded by one of the object bounding boxes 4 at all.

This clearly indicates a need for an improved method for detecting objects in image data. Such an improved method may also be useful in scenarios where a change detection algorithm detects areas of the image where change has taken place, because a finer delineation of the foreground object or objects than may be provided by conventional object detection algorithms may be required.

Figure 2:
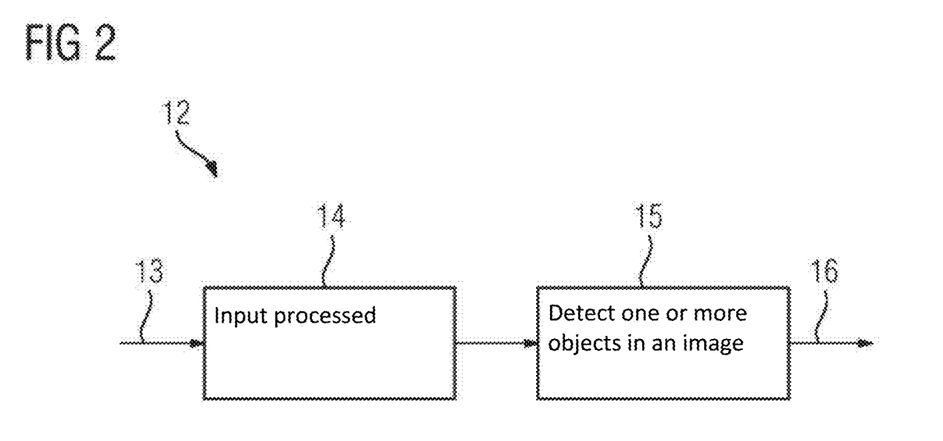
FIG. 2 depicts a schematic illustrating an example of a data flow relating to a method for analyzing an image.

FIG. 2 shows a schematic 12 illustrating a data flow relating to a method for object detection in an image. In a first act an input 13 is provided, which may include a raw or unchanged image to be analyzed for detectable objects. The input 13 is fed into a first stage 14. In this first stage 14, the input 13 may be processed using a conventional object detection algorithm or a change detection algorithm, or the image or images contained in the input 13 may be subdivided or cropped. The first stage 14 may as an output provide the input 13 complemented with region proposals or bounding boxes corresponding to the regions containing changing features or detected objects respectively. These results or outputs of the first stage 14 and therefore the parts or crops of the input 13 are in turn provided to an apparatus 15 as an image or images to be further analyzed. The apparatus 15 is configured to carry out an improved method for detecting one or more objects in an image described in further detail below. The apparatus 15 may provide as output 16 the input 13 with refined, separated, and/or additional bounding boxes 4.

Figure 3:
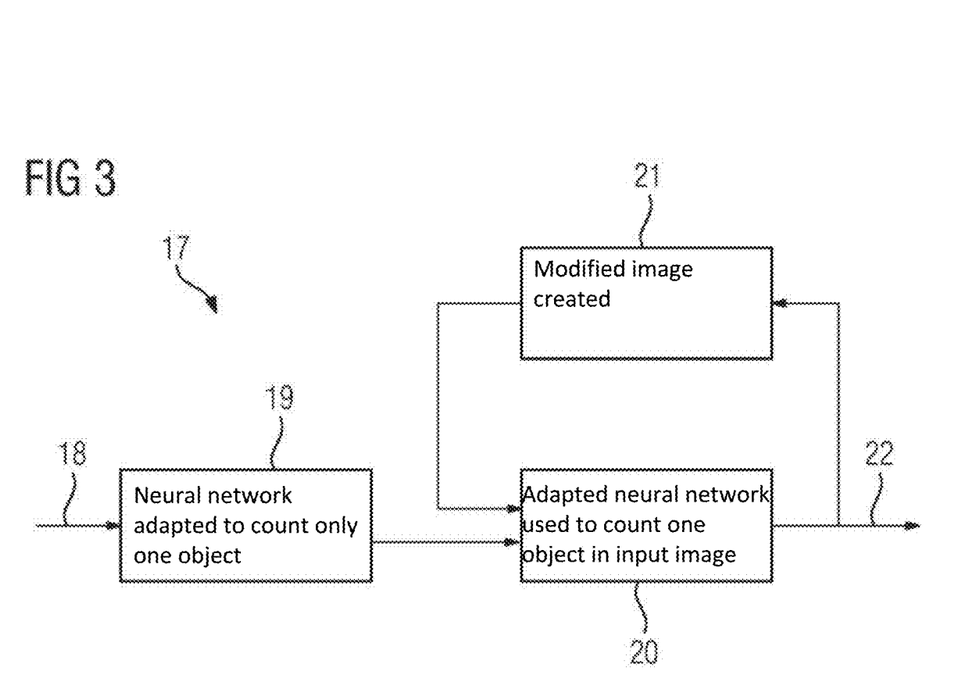
FIG. 3 depicts a schematic illustrating an example of acts of a method for detecting objects in an image.

FIG. 3 depicts a schematic 17 illustrating a structure and functionality of the apparatus 15. Here, an input image 18 to be processed and analyzed for detectable objects is provided. In a tuning act 19, an artificial deep convolutional neural network pre-trained for counting objects is configured to count only one object, even if the input image 18 contains multiple objects. In a counting act 20, the adapted neural net is used to count one object in the input image 18. The counting act 20 presently includes a forward pass of the input image 18 through the adapted neural net as well as a backward or deconvolution pass through the adapted neural net in the opposite direction. The resulting output of the backward pass reveals the single object counted in the counting act 20. This is the case because the neural net is configured to count one object and the highest layers of the adapted neural net are the most task specific with—in this case—the task being counting objects.

During the forward and backward passes through the adapted neural net features of the input image 18 or causes of specific activations in the different layers and filters of the adapted neural net are discarded or disregarded so that the focus lies on only one object or features or causes corresponding to the one counted object.

A cause of an activation may be a feature of the input image 18 and/or an output of one of the intermediate layers or filters of the neural net responsible for a specific activation or activation pattern within one layer or filter of the respective neural net. To refer back to the example with pedestrians as objects to be detected, the result of the tuning act 19 is such that the adapted neural net is able to focus its attention on one specific pedestrian in the counting act 20.

The output of the backward pass may then be processed by a conventional low-level image processing algorithm to detect the counted object and, optionally, mark its location in the input image 18. This enables the removal of the detected object from the input image 18 in a modification act 21. In the modification act 21, a modified image is therefore created. This modified image may be understood to be the input image 18 minus the image data corresponding to the detected object. This modified image may in an iterative process then be used as input for the next iteration of the counting act 20.

Because the object that has been counted and detected first is removed in the modified image, the actual object count of the modified image is lower than the object count of the input image 18 by one. By undergoing multiple of these iterations, all objects contained within the input image 18 may sequentially be detected and removed from the respective image processed in each respective iteration. When no more objects are detected the iteration loop of subsequent counting acts 20 and modification acts 21 may be stopped.

The output 22 may be the input image 18 with all detected objects marked by a respective bounding box. If, for example, the input image 18 contains only a single object, this object may also be effectively detected in the described manner, wherein the modification act 21 is only executed once, because the method may terminate, if the result of the counting act 20 indicates that no object may be detected, that is, if at any point the object count is or becomes zero.

If the deep neural net pre-trained for counting objects is instead tuned for a higher number of objects, that is, to count a higher number of objects, correspondingly more objects would be visible in the deconvolved output, that is, in the output of the backward pass. This behavior of counting the number of objects for which the pre-trained neural net is tuned may presently be exploited by tuning the pre-trained neural net to count one object. This effectively results in the ability to detect a single object. This approach may be used to separate closely spaced objects or objects occluding one another to achieve a higher detection accuracy compared to conventional object detection algorithms using neural networks trained for object detection.

The neural net pre-trained for counting objects may be understood to be pre-trained for multiple classes. Each class corresponds to a specific number of objects, that is, a specific object count. One of these multiple classes—in this case the class corresponding to an object count of one—is used as a selected class for tuning the pre-trained neural net. The features and parts of the image making up and/or corresponding to one pedestrian 3 therefore are the features corresponding to the selected class for which the neural net is adapted.

Figure 4:
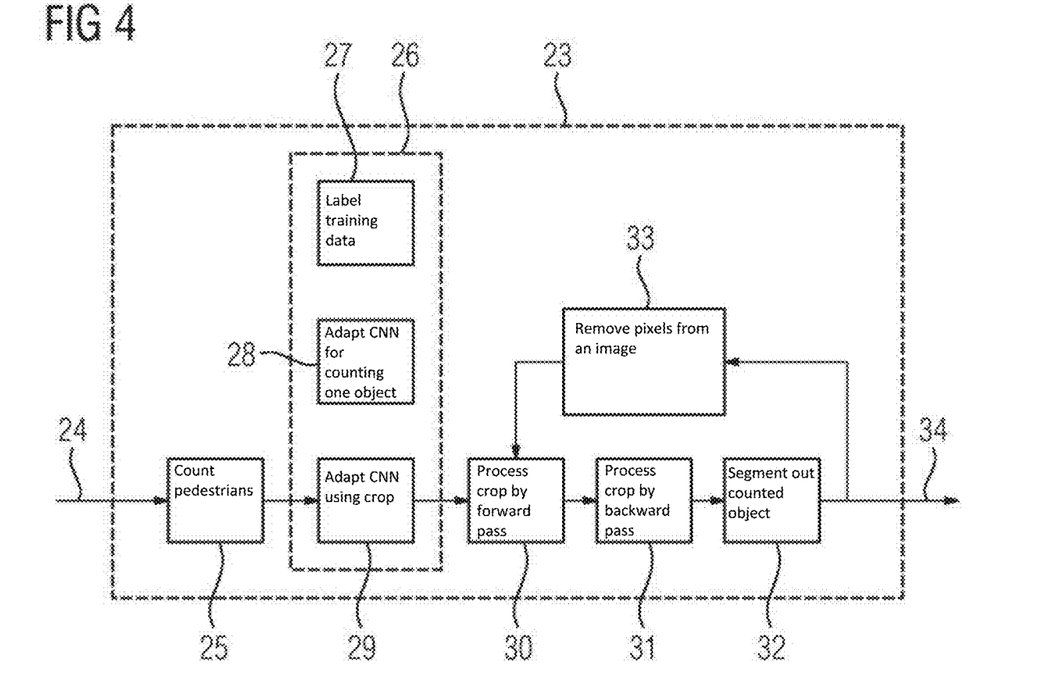
FIG. 4 depicts a more detailed example and complemented version of the schematic shown in FIG. 3.

FIG. 4 depicts a more detailed and complemented version of the schematic 17 shown in FIG. 3. All functions indicated to be contained inside of the dashed line 23 may be considered to be functions of the apparatus 15 shown in FIG. 2. These functions are explained below with reference to FIGS. 5-10. Corresponding to the input image 18 a crop 24 of a 2D image is provided as input image data to be analyzed for detectable objects. An example of the crop 24 is shown in FIG. 6 as the image 48. The image 48 shows a first pedestrian 49 and a second pedestrian 50, wherein the second pedestrian 50 is partly occluded by the first pedestrian 49.

The crop 24 is fed into a deep convolutional neural net (CNN) denoted as CNN 25. In the present example the CNN 25 is trained to count pedestrians in 2D images.

Figure 5:
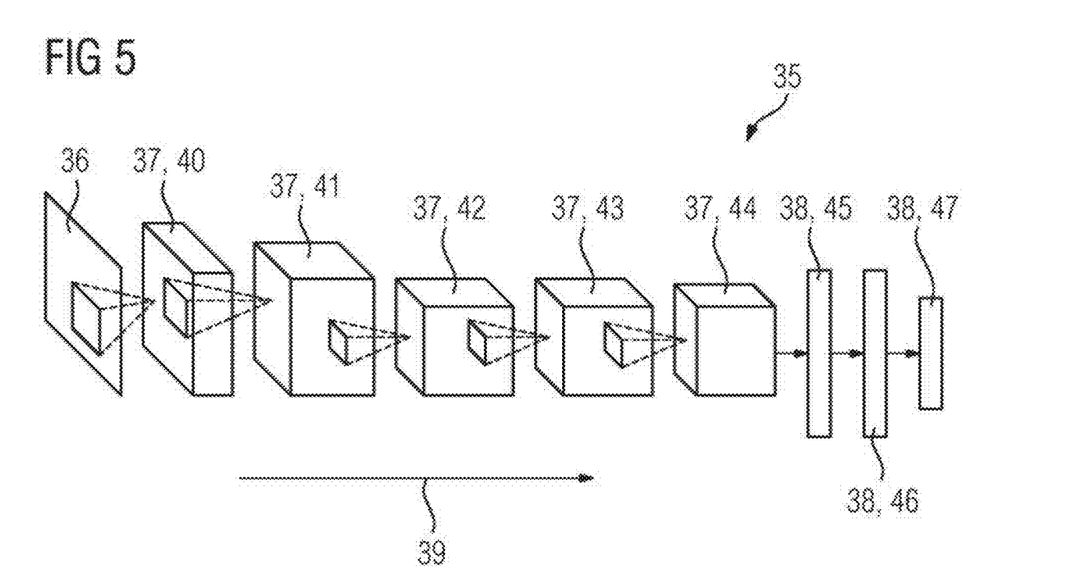
FIG. 5 depicts a schematic illustrating an example of a structure of a deep convolutional neural net which may be used to analyze images.
Figure 6:
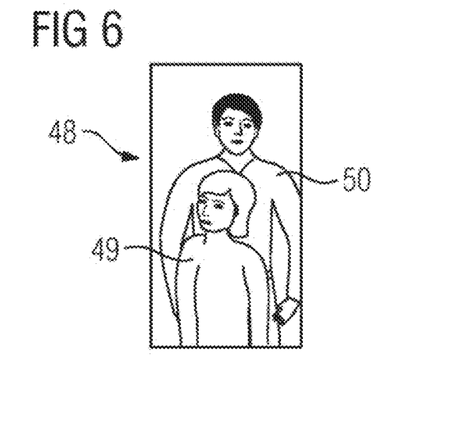
FIG. 6 schematically depicts an example of an image to be analyzed showing a first and a second pedestrian, one of whom is partly occluded by the other.

FIG. 5 schematically shows an example of a possible layer structure 35 of the CNN 25. During a forward pass through this layer structure 35 the crop 24 is received at an input data layer 36. The input data layer 36 is followed by five convolutional layers 37 which in turn are followed by three fully connected layers 38. The different shapes and sizes of the layers 36, 37, 38 schematically indicate different corresponding dimensions, that is, numbers of neurons and filters. The smaller squares in the input data layer 36 and the first four convolutional layers 40 to 43 indicate a respective kernel size. In the present example the input data layer 36 may have a size of 227 by 227 neurons with a kernel size of 11 by 11. The first convolutional layer 40 may have a size of 55 by 55 neurons with a thickness of 96 which indicates the number of filters in the direction of the data flow as indicated by arrow 39. The kernel size of the first convolutional layer 40 may be 5 by 5. The second convolutional layer 41 may have a size of 27 by 27 neurons with 256 filters. The kernel size for the second convolutional layer 41, the third convolutional layer 42 and the fourth convolutional layer 43 may all be the same at 3 by 3. The third convolutional layer 42 and the fourth convolutional layer 43 may have the same dimensions at for example 13 by 13 neurons with 384 filters each. The fifth convolutional layer 44 may have the same size at 13 by 13 neurons but only 256 filters. The first fully connected layer 45 and the second fully connected layer 46 may have 1024 filters each. The CNN 25 may be trained to count 0 to 15 or 1 to 16 pedestrians. Correspondingly, the third fully connected layer 47, that is, the output layer which acts as a classifier includes 16 classes for the different pedestrian counts. As part of the CNN 25, rectified linear units (ReLUs) may be used as activation functions, while pooling and local response normalization layers may be present after the convolutional layers 37. Dropout may be used to reduce overfitting.

The crop 24 is processed by the CNN 25 to obtain a reference or predicted count of the objects present in the crop 24. Corresponding to the tuning act 19 referred to in FIG. 3 this is followed by a tuning act 26 to adapt the CNN 25 to count only one object. There exist several different options to carry out this tuning or adaptation. In a first tuning option 27, the respective training data is labelled or annotated with a count of one to adapt the CNN 25 to count one object. In a second tuning option 28, the CNN 25 is adapted for counting one object using a group of images or crops. These multiple crops may be crops from a single larger image or they may be crops from multiple different images, for example multiple different frames of a video sequence. In a third tuning option 29, the CNN 25 is adapted for counting one object using the same crop 24 to be further analyzed in subsequent acts. The tuning options 27, 28, 29 may also be combined in various ways.

The tuning of the CNN 25 as well as its training to count objects may be done by providing corresponding training data. The training data may include different types of images such as synthetic images, and/or natural images, or a combination thereof. Advantageously, a comparatively large amount of synthetic images may be used for training the CNN 25, while the tuning may be achieved using comparatively few natural, that is, real images. This avoids the need for large amounts of manually annotated training data. The tuning act 26 results in a tuned or adapted neural net.

Following the tuning act 26, the crop 24 is processed by a forward pass 30 through the adapted neural net. An output of this forward pass 30 is then processed again by a backward pass or deconvolution 31 through the adapted neural net which generates a processing result. This processing result after the deconvolution 31 is an image revealing a single object counted in the forward pass 30.

The deconvolution 31 is followed by a post-processing act 32. The post-processing act 32 is done in order to segment out the counted object from the deconvolved output. This may include several different low-level image processing acts such as pseudo-coloring, highlighting of regions corresponding to the counted object based on intensity, thresholding, contour detection, and generation of a bounding box surrounding the counted and detected object.

Figure 7:
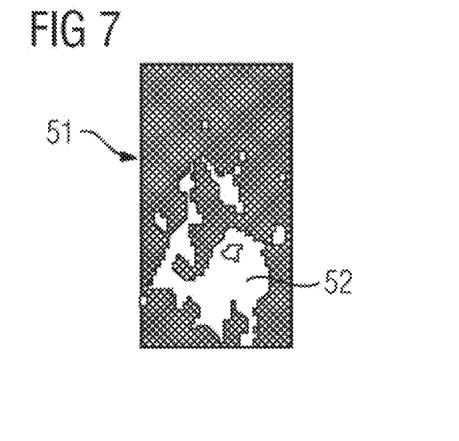
FIG. 7 schematically depicts an example of a result of several acts of processing the image shown in FIG. 6.

FIG. 7 schematically depicts an intermediary post-processing result 51 after pseudo-coloring, highlighting, and thresholding. These low-level image processing acts reveal a contour 52 corresponding to the detected object, which in this case is the first pedestrian 49 shown in FIG. 6.

Figure 8:
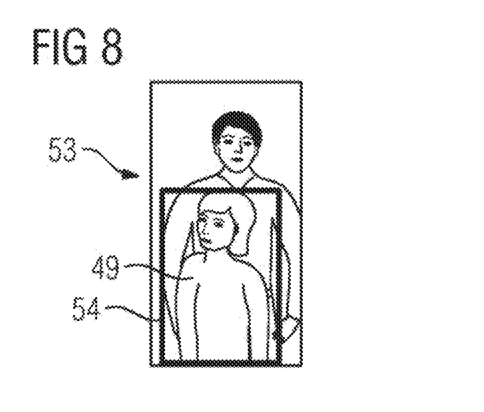
FIG. 8 schematically depicts an example of the image shown in FIG. 6 with a bounding box surrounding the detected first pedestrian.
Figure 9:
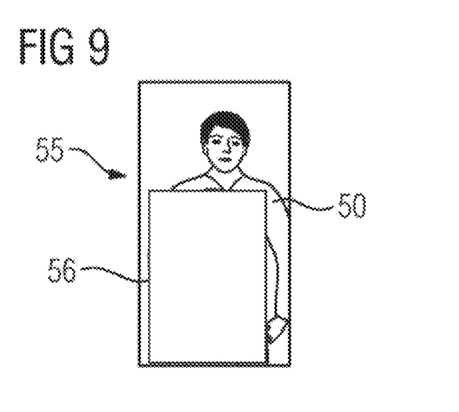
FIG. 9 schematically depicts an example of the image shown in FIG. 6 with a region corresponding to the first pedestrian removed from the image.
Figure 10:
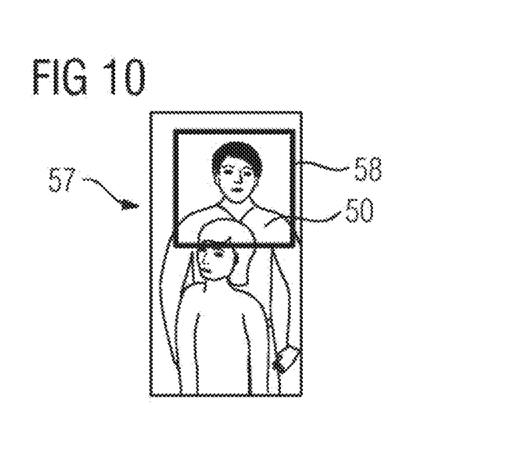
FIG. 10 schematically depicts an example of the image shown in FIG. 6 with a bounding box around the detected second pedestrian.

FIG. 8 shows a first final post-processing result 53 with a first bounding box 54 surrounding the detected object, that is, the first pedestrian 49. The first bounding box 54 is generated based on the detected contour 52.

The first final post-processing result 53 is then passed on to a modification stage 33. In this modification stage 33 pixels corresponding to the detected first pedestrian 49 are removed from the first final post-processing result 53 or the corresponding crop 24, that is, the image 48. Presently, this is done by replacing the area and contents of the first bounding box 54 with pixels of a uniform intensity and color. This results in a modified crop 55 shown in FIG. 9. Here, a part of the image 48 corresponding to the detected first pedestrian 49 as indicated by the first bounding box 54 is now replaced by a replacement region 56 of uniform color and intensity. Therefore, all features and causes leading to the counting and the detection of the first pedestrian 49 in the forward pass 30 and the post-processing act 32 are no longer distinguishable in the modified crop 55. Instead of replacing the area of the first bounding box 54, it is also possible to do a more detailed segmentation of the first pedestrian 49. The better this segmentation matches the first pedestrian 49, that is, the respective detected object, the fewer pixels not belonging to the first pedestrian 49 are removed from the first post processing result 53 or the image 48, respectively. This in turn may lead to improved detection results for other remaining objects still to be detected in subsequent iterations, such as the second pedestrian 50.

In a second iteration of the described process, the modified crop 55 is provided as input to the adapted neural net for processing by a second forward pass 30, a second backward pass 31, and a subsequent second post-processing act 32. Processing the modified crop 55 this way results in a second post-processing result 57 schematically shown in FIG. 10. Therein, the second pedestrian 50 is detected and marked by a surrounding second bounding box 58. This iterative process for sequentially detecting all objects in the image 48 may be repeated until no more objects are detected.

An overall output 34 of the described processing of the crop 24 may include the respective post-processing results 53, 57 of all processing iterations and/or a combination of those, that is, the crop 24 or image 48 with all detected objects, that is, all detected pedestrians 49, 50, marked by respective bounding boxes 54, 58.

As described above, an object count of one is used to generate the adapted neural net and to therewith extract a single foreground object. This is only possible because the CNN 25 has previously been trained for counting objects. If, by contrast, a label of one is used and the classifier is trained from scratch, it is very difficult for the resulting neural net to focus on a single foreground object. However, because the feature extractor, that is the neural net or a part thereof, learned to extract features useful for counting, all—or, in the present example, both—foreground objects would then be revealed in the deconvolved output. In other words, if the CNN 25 trained for counting objects is not used and the last fully connected layer 47 would be trained from scratch instead, both or all foreground object would become visible even though a count of one might be used for tuning.

Summing up, it is possible to use a counting model, that is, a deep neural net pre-trained for counting objects, to also detect objects by tuning it to the limit of counting only one object. This allows the accurate and reliable detection of closely spaced and/or partly occluded objects, such as the pedestrians 3, 49, 50. In general, occlusion by similar foreground objects may be a challenging situation as compared to occlusion by objects not considered as part of the foreground because the classifier may be trained to reject objects that are not of interest. If, however, the foreground object is being occluded by another foreground object of the same type or category, the challenge is to detect the partially occluded and the not-occluded object separately because they appear to overlap in a 2D image. To meet this challenge, the present disclosure suggests using a deep neural net pre-trained for counting objects and tuned for counting one object such that it is able to focus its attention on one object at a time. In the described example the neural net is trained on crops of images with varying numbers of pedestrians and then tuned towards counting one pedestrian. The underlying principle idea of the present disclosure is thus, that a neural net capable of counting, when pushed towards the extreme limit of counting one object, may be used for object detection.

Although the disclosure has been illustrated and described in greater detail by the exemplary embodiments, the disclosure is not restricted by the disclosed examples and other variations may be derived herefrom by the person skilled in the art without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for analyzing an image having features corresponding to at least one class, the method comprising:
adapting an artificial deep neural net pre-trained for multiple classes to focus on exactly one selected class of the multiple classes by providing to pre-trained neural net training data that is labelled with the selected class, wherein the image has features corresponding to the selected class;
processing the image by a forward pass through the adapted neural net to generate a processing result that is an output of the adapted neural net after the forward pass;
analyzing the processing result to detect therein at least one object corresponding to the selected class by using an image processing algorithm to detect and segment a manifestation of the object corresponding to the selected class in the processing result; and
generating a modified image by removing the manifestation of the object corresponding to the selected class from the image, wherein the modified image is iteratively used as input for the adapted neural net to analyze the modified image for possible remaining manifestations of the object corresponding to the selected class, and/or wherein the pre-trained neural net is pre-trained for counting objects in images and the pre-trained neural net is adapted for counting exactly one object.

2. The method of claim 1, wherein the processing result is taken from at least one filter of an intermediate layer of the adapted neural net and/or from an output layer of the adapted neural net.

3. The method of claim 1, wherein the image is processed by the forward pass and a subsequent backward pass through the adapted neural net to generate the processing result.

4. The method of claim 3, wherein the backward pass is started from an intermediary layer of the adapted neural net.

5. The method of claim 1, wherein the artificial deep neural net is a deep convolutional neural net, a deep feed-forward neural net, or a combination thereof.

6. The method of claim 1, wherein the pre-trained neural net is adapted offline using training data.

7. The method of claim 1, wherein, before the image is processed by the corresponding forward pass, the pre-trained neural net is adapted online using the image.

8. The method of claim 1, wherein the artificial deep neural net is adapted using a group of images, and
wherein, after the adaptation, the group of images is sequentially processed without further adaptation steps.

9. The method of claim 1, wherein the at least one object is removed by replacing pixel values of pixels corresponding to the at least one object with a predetermined value.

10. The method of claim 1, wherein the pre-trained neural net is used to process the image to obtain a reference class for the image before adapting the pre-trained neural net.

11. An apparatus for analyzing an image having features corresponding to at least one class, the apparatus comprising:
an artificial deep neural net pre-trained for multiple classes; and
a separate image processing unit,
wherein the apparatus is configured to:
process the image by a forward pass through an adapted neural net to generate a processing result that is an output of the adapted neural net after the forward pass, wherein the adapted neural net is adapted from the pre-trained neural net to focus on exactly one selected class of the multiple classes by providing to pre-trained neural net training data that is labelled with the selected class, and wherein the image has features corresponding to the selected class, and
provide the processing result to the image processing unit,
wherein the image processing unit is configured to:
analyze the processing result to detect therein at least one object corresponding to the selected class by using an image processing algorithm to detect and segment a manifestation of the object corresponding to the selected class in the processing result, and
generate a modified image by removing the manifestation of the object corresponding to the selected class from the image, and
wherein the apparatus is configured to iteratively use the modified image as input for the adapted neural net to analyze the modified image for possible remaining manifestations of the object corresponding to the selected class, and/or
wherein the pre-trained neural net is pre-trained for counting objects in images and the pre-trained neural net is adapted for counting exactly one object.

* * * * *